United States Patent [19]

Duncan et al.

[11] Patent Number: 5,048,638

[45] Date of Patent: Sep. 17, 1991

[54] SYSTEM FOR CONTROLLING THE GROUND SPEED AND DIRECTION OF TRAVEL OF AN OFF-ROAD VEHICLE

[75] Inventors: Jerry R. Duncan, Bettendorf, Iowa; Kenneth E. Hunt, Madison; Eugene G. Hayes, Beaver Dam, both of Wis.

[73] Assignee: Deere & Company, Moline, Ill.

[21] Appl. No.: 569,243

[22] Filed: Aug. 16, 1990

Related U.S. Application Data

[63] Continuation of Ser. No. 254,768, Sep. 17, 1988, abandoned.

[51] Int. Cl.⁵ .................. G05G 3/00; B60K 20/04
[52] U.S. Cl. ................................. 180/307; 74/474; 74/561; 180/336
[58] Field of Search ............. 180/336, 315, 307, 6.34; 74/512, 561, 474

[56] References Cited

U.S. PATENT DOCUMENTS

| | | | |
|---|---|---|---|
| 2,257,724 | 10/1941 | Bennetch | 60/19 |
| 2,362,521 | 11/1944 | Acton | 180/336 |
| 2,989,875 | 6/1961 | Torrance | 74/478 |
| 3,262,525 | 7/1966 | Ehlke et al. | 192/13 |
| 3,313,174 | 4/1967 | Walker et al. | 74/474 |
| 3,525,266 | 8/1970 | Brooks | 74/481 |
| 3,691,863 | 9/1972 | Shaffer | 74/478 |
| 3,868,003 | 2/1975 | Smith | 192/4 B |
| 3,943,712 | 3/1976 | Stuhr | 60/327 |
| 4,014,218 | 3/1977 | Brandt | 74/474 |
| 4,129,047 | 12/1978 | Dorman | 74/474 |
| 4,245,527 | 1/1981 | Hildebrecht | 74/474 |
| 4,341,129 | 7/1982 | Bando | 74/481 |
| 4,608,879 | 9/1986 | Ishida et al. | 74/474 |
| 4,759,417 | 7/1988 | Wanie | 180/336 |

FOREIGN PATENT DOCUMENTS

| | | |
|---|---|---|
| 237940 | 4/1960 | Australia ............. 180/336 |
| 936105 | 10/1973 | Canada ............. 180/336 |
| 1630683 | 5/1971 | Fed. Rep. of Germany . |
| 1817849 | 8/1972 | Fed. Rep. of Germany . |
| 2618708 | 11/1977 | Fed. Rep. of Germany . |
| 130176 | 9/1955 | Japan . |
| 43-19860 | 8/1968 | Japan . |
| 48-2636 | 1/1973 | Japan . |
| 52-17298 | 5/1977 | Japan . |
| 141687 | 3/1979 | Japan . |
| 106972 | 6/1981 | Japan . |
| 184729 | 12/1985 | Japan . |
| 61-3160 | 1/1986 | Japan . |
| 63-159143 | 7/1988 | Japan . |
| 156837 | 11/1967 | Netherlands . |
| 1122511 | 8/1968 | United Kingdom . |
| 1341361 | 12/1973 | United Kingdom . |

*Primary Examiner*—David M. Mitchell

[57] ABSTRACT

An improved system for controlling the ground speed and direction of an off-road vehicle having systems for establishing and returning a variable speed transmission to the neutral position, an improved pedal system interconnected to the neutral location and return system for driving the vehicle in either the forward or the reverse direction. The pedal system includes a forward and a reverse pedal which are positioned on the vehicle so that an operator moves the toe of his foot in the direction that he wants the vehicle to move. The forward pedal is positioned closer to the front of the vehicle than the reverse pedal. An additional aspect of one embodiment of the present invention includes an interconnection cam means for operatively connecting the pedal system, the brake system and the neutral location and return system so that upon actuation of the brake system, the interlock system is operable to return the transmission to neutral and with the park brake engaged, allow an operator to dismount the vehicle with the engine running.

45 Claims, 10 Drawing Sheets

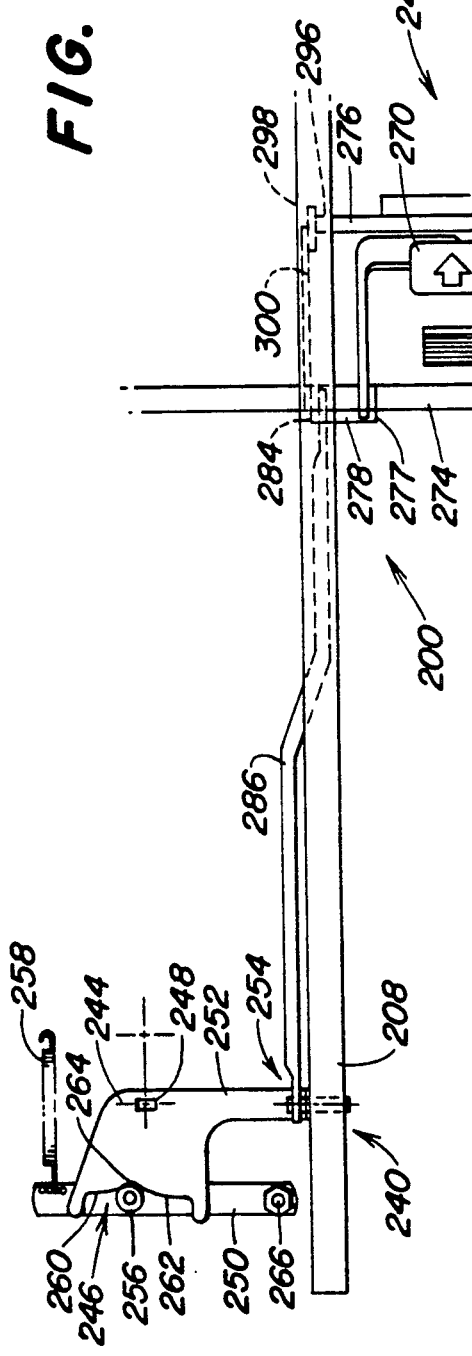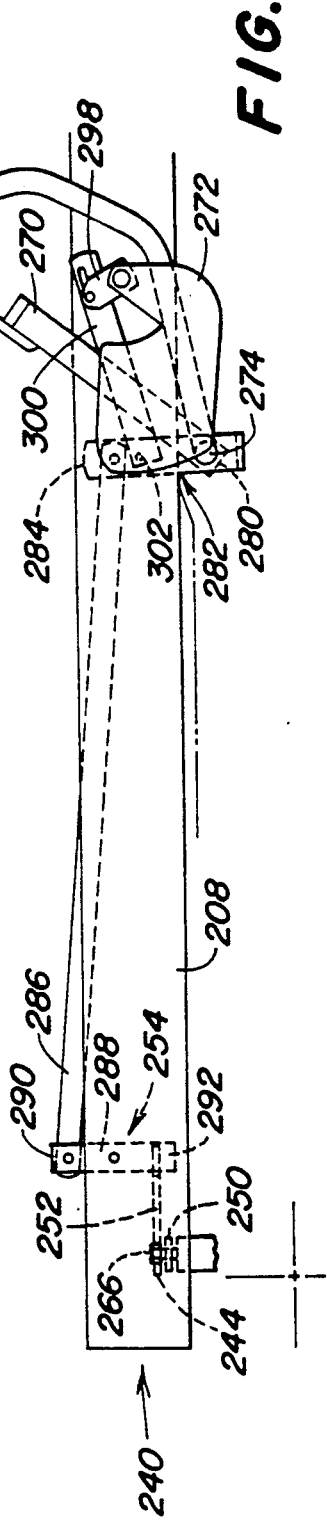

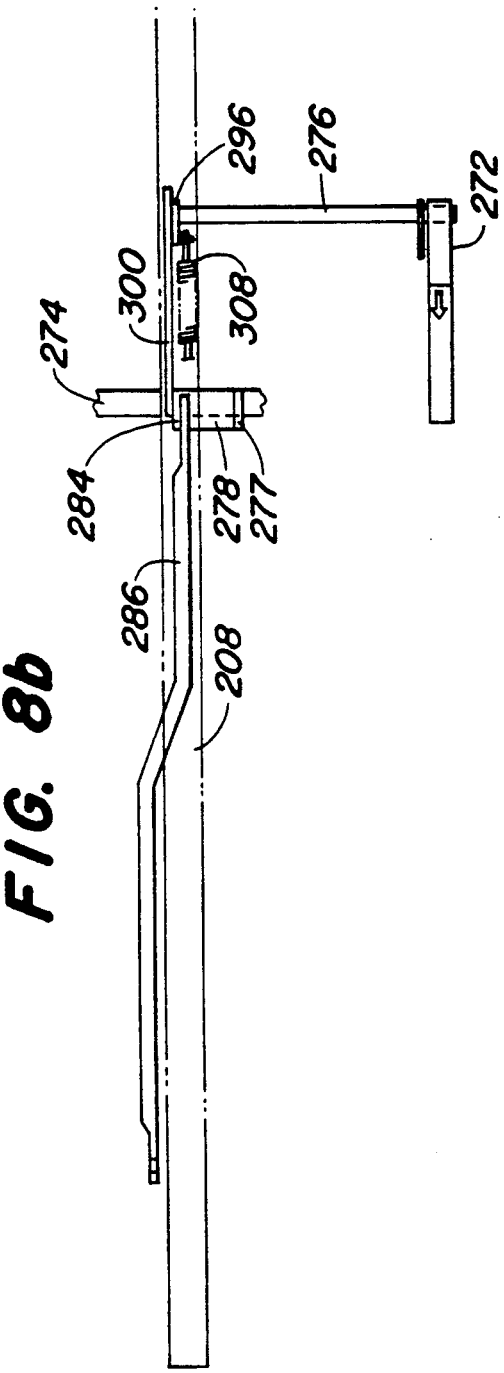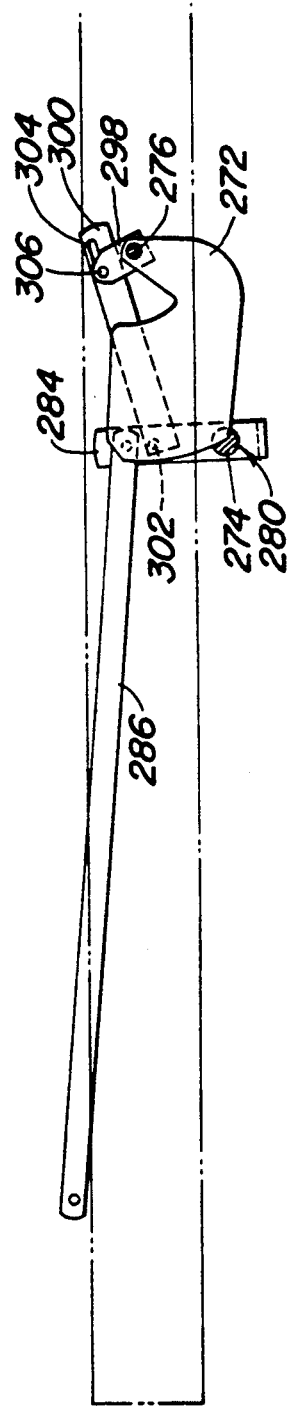

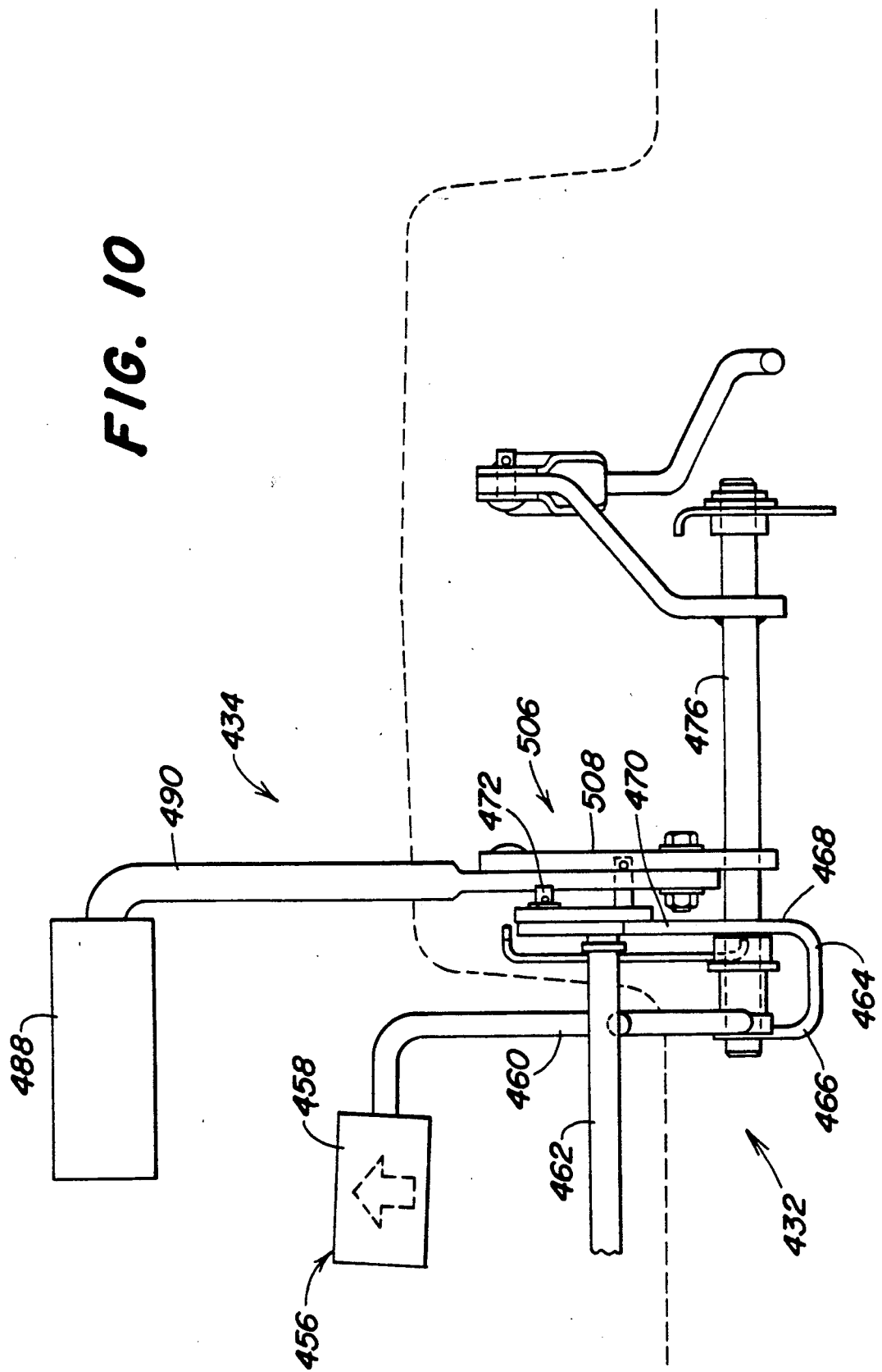

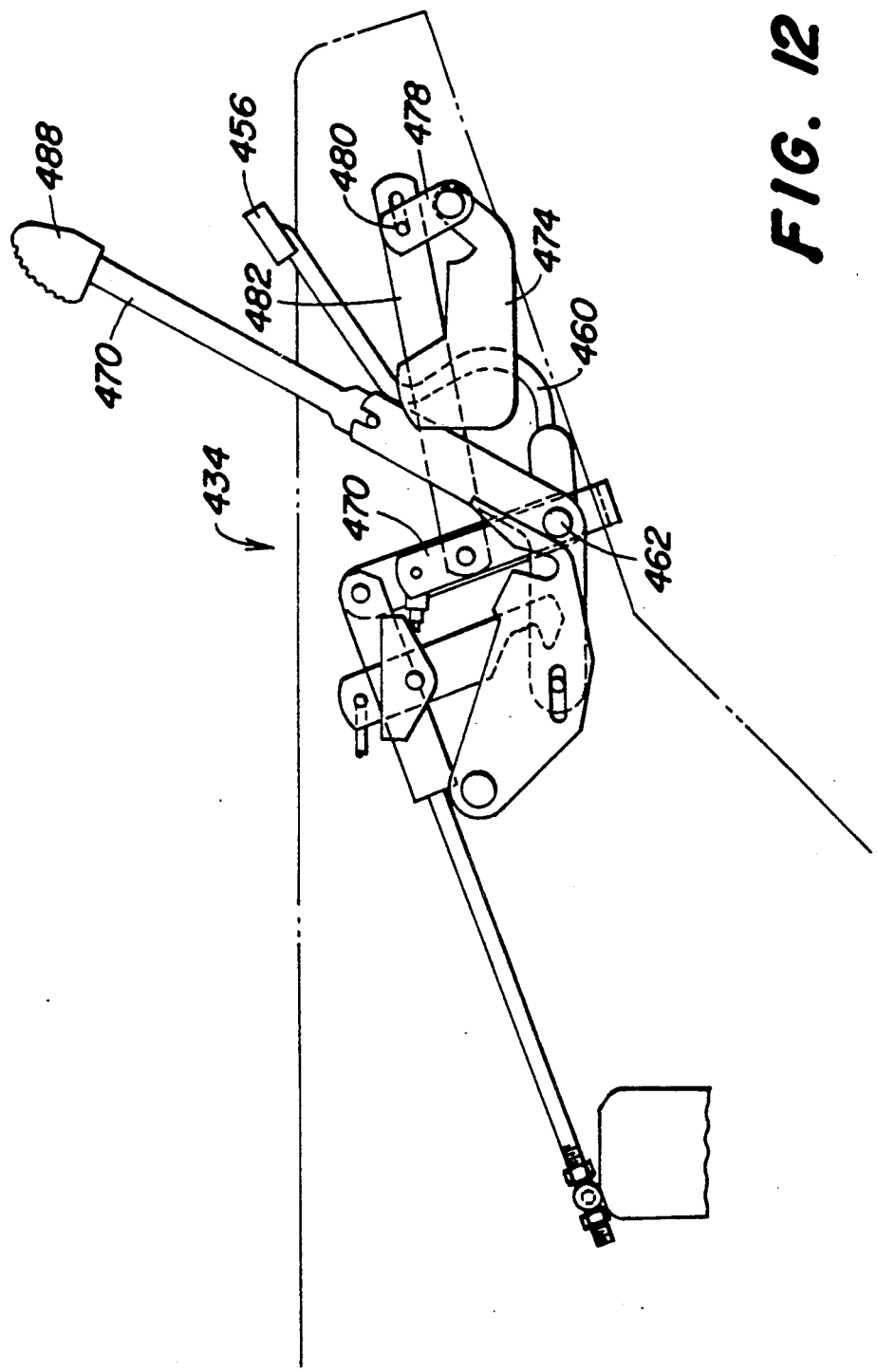

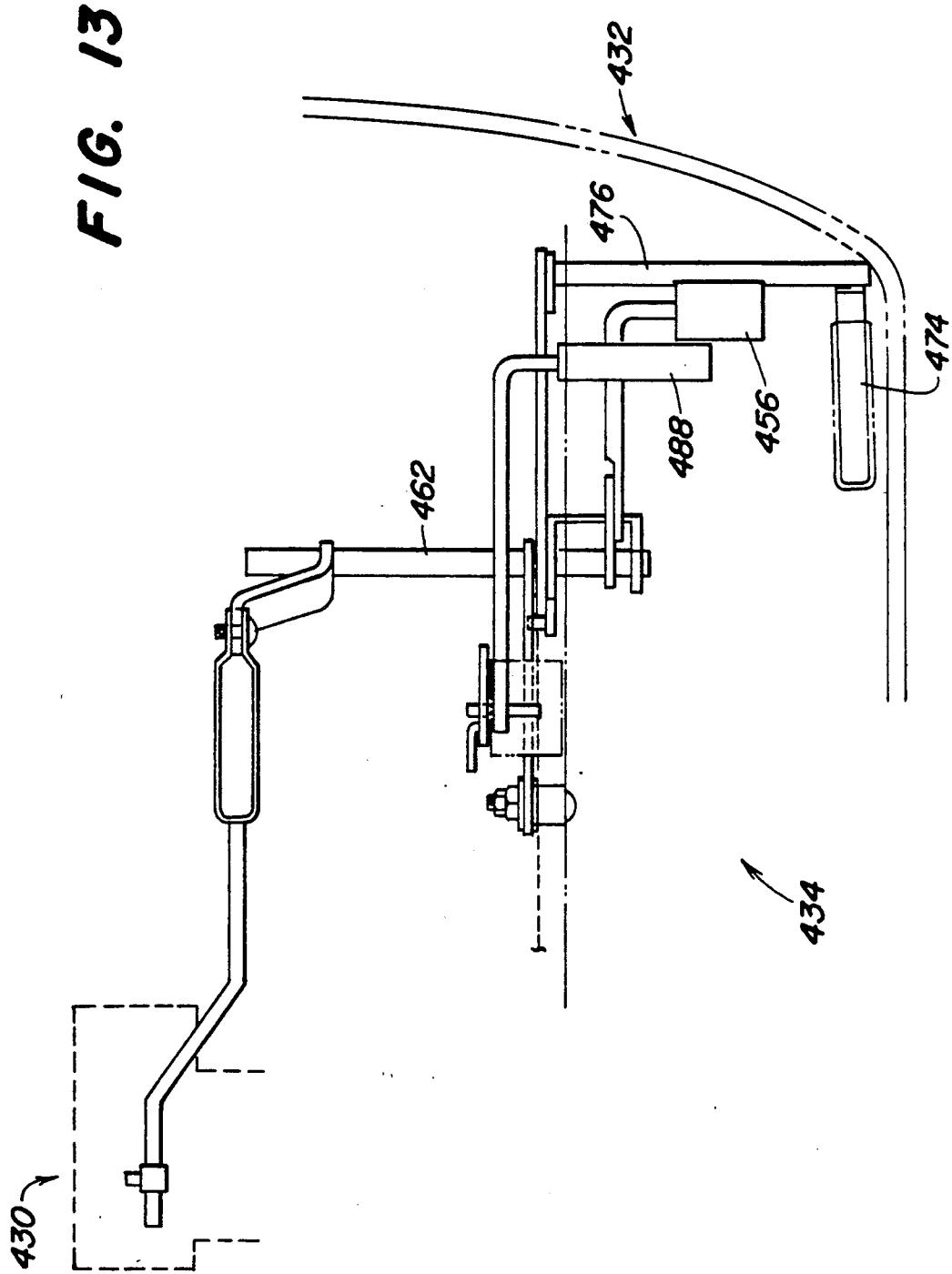

SYSTEM FOR CONTROLLING THE GROUND SPEED AND DIRECTION OF TRAVEL OF AN OFF-ROAD VEHICLE

This application is a Continuation of application Ser. No. 07/254,768, filed Sept. 17, 1988 now abandoned.

BACKGROUND OF THE INVENTION

The present invention relates to an improved system for controlling the ground speed of an off-road vehicle and, more specifically relates to an improved interconnected system for controlling the ground speed of lawn tractors, lawn and garden tractors and front-mount mowers having variable speed transmissions, such as hydrostatic or continuously variable transmissions.

It is well known to provide off-road vehicles, specifically lawn tractors, lawn and garden tractors, and front-mount mowers with systems for controlling their ground speed. Typically, variable speed transmissions such as hydrostatic transmissions or continuously variable transmissions utilized in off-road vehicles such as those listed above have used different combinations of hand and foot controls to select the direction of travel and to control the relative vehicle speed. Conventional off-road vehicle hand controls require that the operator remove at least one hand from the steering wheel to reach a control lever and to move it to the appropriate location. During the movement of the operator's hand from the steering wheel to the control lever, the operator is required to interrupt his concentration from the task he is performing with the vehicle in order to concentrate on moving his hand control to the proper position. Thus, with conventional hand controls, there is a tendency for operators to break their concentration and thereby to reduce productivity and operating comfort.

Another conventional system utilized to control the ground speed of the types of off-road vehicles mentioned above, includes a treadle pedal which is essentially a heel and toe forward and reverse control mechanism. With the treadle pedal control system, an operator normally places his foot on the pedal in such a way that the toe of the operator's foot would contact one portion of the treadle pedal and the heel would contact another portion. To drive the vehicle in the forward direction, the operator presses his toe forward thereby raising his heel off of the vehicle footrest. To change the movement to the direction to reverse or to slow it down, the operator would increase the pressure on his heel until the vehicle eventually came to the neutral position and to a complete stop; and then continue pressing his heel down toward the foot rest in order to produce vehicle movement in the reverse direction.

The conventional treadle pedal system has proved to have three significant problems, the first being operator discomfort which results from the fore-and-aft movement of the foot and the second, somewhat related to the first, being difficulty in modulating the vehicle's speed in either the forward or reverse direction because the conventional treadle pedal design requires that the operator keep his foot on both the forward control and reverse control portions of the pedal simultaneously. Additionally, because the operator's leg is suspended above the foot rest, with the foot located on a movable pedal without the foot maintaining contact with the foot rest thereby providing foot stability, vehicle speed control over rough terrain has proven most difficult.

A third and perhaps the most desirable ground speed control system developed to date for off-road vehicles is the dual pedal side-by-side system. The details of this system are disclosed in U.S. Pat. No. 4,759,417 dated Jul. 26, 1988 issued to Wanie et al. and commonly assigned to the assignee of the present application, the disclosure of which is hereby incorporated by reference. However, the side-by-side pedal location required the operator to use one foot to operate both the forward and reverse pedal and therefore, occasionally resulted in the wrong pedal being pressed for the direction the operator intended to have the vehicle move.

Specifically, in the two pedal side-by-side system, the two pedals are operated by the right foot. Each of the pedals when pushed moves through a similar forward arc. The main distinguishing feature between the reverse speed control pedal and the forward speed control pedal is that the reverse speed control pedal is located to the right of the forward speed control pedal. Both pedals occasionally require that the right foot and leg be lifted and the foot placed on the correct pedal in order to move the vehicle in the desired direction.

This side-by-side relationship is not as natural for an operator to relate to forward and reverse as are forward and reverse position pedals, since the operator moves his foot through a similar arc for both forward and reverse vehicle movement. Consequently, it may sometimes be difficult for an operator to feel which pedal his foot is engaging without looking.

An additional problem with present control systems is that they generally rely on a spring-loaded mechanism to return the variable speed or hydrostatic transmission to neutral. Frictional resistance in the lever controls or pedals and the linkages between the lever control or pedals and the variable speed transmission which may be caused by dirt, rust or other impairments, may exceed the force which the neutral return spring exists on the mechanism.

Accordingly, there is a need for an improved system for controlling the ground speed and direction of travel of maneuverable off-road vehicles having variable speed transmissions such as variable speed hydrostatic transmissions; which allows an operator to know by feel which direction pedal he is engaging with his foot without looking. Such a system should improve vehicle operator efficiency, in foot movement, decreasing fatigue, increasing productivity and comfort. Additionally, it would be desirable to have a foot pedal control system that provides different engaging areas for forward and reverse and which allows an operator to maintain his heel in contact with the vehicle foot rest during the disengagement of one pedal and engagement of the other.

SUMMARY OF THE INVENTION

The present invention is an improved system for controlling the ground speed and direction of a maneuverable off-road vehicle. In each of the preferred embodiments, the system of the present invention is illustrated utilizing a representative compact utility tractor, a representative lawn and garden tractor and a representative front-mount mower, each having a variable speed transmission such as a hydrostatic transmission. The system of the present invention includes: an engine operatively connected to a variable speed transmission; a two pedal direction control system operatively connected to the variable speed transmission control shaft for selectively engaging the transmissions so that the vehicle is operated in either the forward or the reverse direction. The two pedal direction control system is arranged on the vehicle relative to each other so that operator foot movement from each of said pedals respectively is the same as the desired direction of vehicle movement.

Additionally, the forward pedal is constructed so that it moves in a forward arc when engaged by an operator and the reverse pedal is constructed so it moves in a rearward arc. These two different pedal movement arcs provide different feel which is readily recognized by an operator.

A further aspect of the present invention includes a system, operatively interconnecting the ground speed control system and the vehicle brake system, for pulling the foot control linkage to neutral when the operator engages the brake pedal.

Accordingly, objects of the present invention include: providing a two pedal control system which allows the operator to differentiate between the forward and reverse pedals by relative pedal position and feel; providing a two pedal control system which allows the operator to differentiate between the pedals without looking; providing improved productivity; providing an improved two pedal control system whereby an operator moves his toe relative to the vehicle in the same direction when engaging the desired pedal as the desired vehicle direction of movement; providing a two pedal control system which enables an operator to more evenly modulate vehicle speed during operation; providing a two-pedal control system whereby direction changes are executed by an operator by simply pivoting his foot at his heel from one pedal to another; providing a brake and pedal system interlock system whereby, when the brake is engaged, the pedal system is returned to the neutral position; providing a system whereby when the park brake is engaged, the pedals are locked so that the machine will not move even if the operator should accidentally engage the pedal while mounting or dismounting the vehicle; and/or providing a simplified system with a lower cost in material, manufacturing and assembly than previous systems.

Other objects and advantages of the invention will be apparent from the following description, the accompanying drawings and the appended claims.

BRIEF DESCRIPTION OF THE DRAWINGS

FIG. 6 is a partial side view illustrating the interconnection of the neutral location and return system and the improved pedal system of FIG. 5;

FIG. 7 is a partial top view illustrating the interconnection of the neutral location and return system and the improved pedal system of FIG. 5;

FIG. 8a is a partial side view of the reverse pedal portion of the improved two pedal system, of FIG. 5 illustrating the lost motion slot;

FIG. 8b is a partial top view of the reverse pedal portion of the improved two pedal system of FIG. 5 illustrating the lost motion slot;

FIG. 10 is a partial front view in section of the improved two pedal system of the present invention installed in the front mount mower of FIG. 9;

FIG. 11b is a partial plan view of the two pedal brake interconnection system of FIG. 11a;

FIG. 12 is a partial side view of the brake and two pedal system interconnection of FIGS. 11a and 11b;

FIG. 13 is a partial top sectional view of the improved system of FIG. 12; and

DETAILED DESCRIPTION OF A FIRST EMBODIMENT

Figure 1:
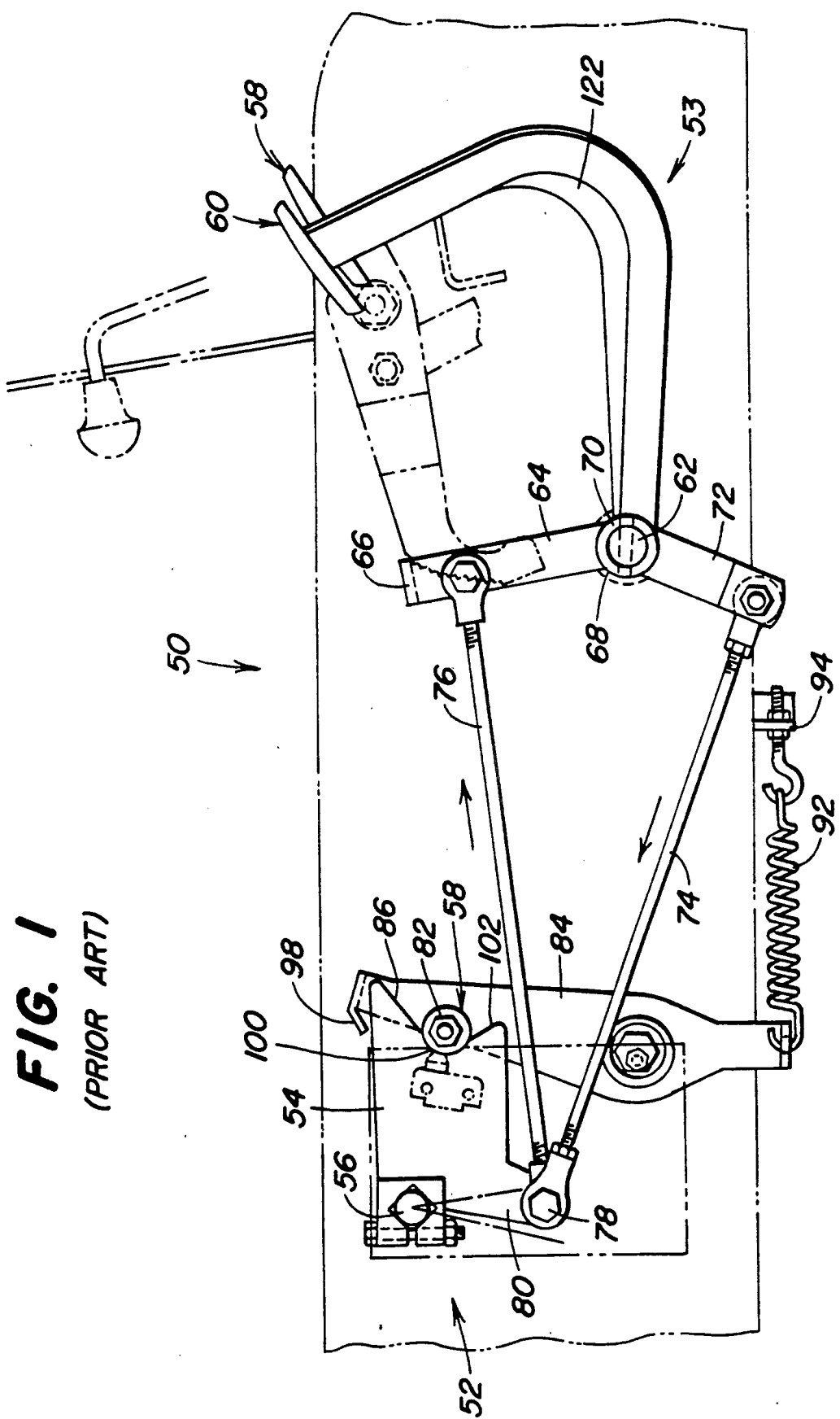
FIG. 1 is a partial side view illustrating the interconnection of a neutral location and return system and a prior two pedal system utilized in a compact utility tractor.

The ground speed control system for a small compact utility tractor, generally designated as 50, of the present invention is illustrated in 2-3. The ground speed control system 50 also includes a system 52 for locating the neutral position of a variable speed transmission and for returning the transmission to neutral and a forward and reverse direction foot control pedal system 53. The system shown in FIG. 1 is generally disclosed in U.S. Pat. No. 4,759,417 issued Jul. 26, 1988 to Wanie et al. and assigned to the assignee of the present application, the disclosure of which is incorporated herein by reference.

As shown in FIG. 1, the forward and reverse pedal system 53 is interconnected to the neutral location and return system 51. The pedal system 53 is utilized to rotate a cam 54 operatively connected to a hydrostatic transmission control shaft 56.

The forward and reverse pedal system 53 includes a forward pedal 58 and a reverse pedal 60, each operatively connected to a shaft 62. A reverse arm 64 with a flange 66 at one end and a hub 68 at the other end is operatively connected to the shaft 62. The hub 68 is conventionally attached to the end of the shaft 62 remote from the connection of the reverse pedal 60 to the shaft 62. The attached arm 64 extends above the shaft 62.

The forward foot pedal 58 is conventionally connected to a pedal bushing 70 rotatably mounted on the shaft 62. The bushing 70 has an arm 72 connected thereto and extending below the shaft 62.

Forward and reverse connecting rods 74, 76 are pivotably connected to the forward 72 and reverse 64 pedal arms, respectively, at one end and are both operatively connected to the respective other ends to a bolt 78 having a spacer thereon. The bolt 78 is operatively connected to a cam extension portion 80. Since the forward pedal 58 is connected to the bushing 70 which is rotatably mounted on the shaft 56, the ground speed contact system functions due to the location of the forward connecting rod 74 being connected below the shaft 62 and the reverse connecting rod 76 being connected above the shaft 62. Both rods 74, 76 are connected to the cam 54 below the cam's pivot point which is about the control shaft 56. Thus, when one or the other of the pedals 58, 60 is depressed, the cam 54 is rotated in opposite directions.

In order to drive a vehicle having the ground speed control system 50 installed therein in either the forward or the reverse direction, an operator would depress either the forward 58 or the reverse 60 pedals. If the operator were to depress the forward pedal 58, which is rotatably connected to the shaft 62, the lower arm 72 would rotate clockwise which would compress the forward connecting rod 74 to the rear which in turn would rotate the cam 54 about the control shaft 56 clockwise. The roller 82 operatively positioned on a cam follower 84 moves along the upper surface 86 of a cam V 88 causing the cam follower 84 to rotate clockwise about its pivot 90.

As the forward pedal 58 is depressed, the reverse pedal 60 is rotated an equal distance in the opposite direction. If the operator were to remove his foot from the forward pedal 58, a resilient means or spring 92 anchored to the frame 94 by the adjustable eye bolt 96 would tend to pull the upper flange 98 of the cam follower 84 counterclockwise causing the roller 82 to seek the apex 100 of the cam V, thus, returning the hydrostatic control shaft 56 to the neutral position and the pedals 58, 60 to the rest position.

In order to propel a vehicle in the reverse direction, an operator would depress the reverse pedal 60 rotating the shaft arm 64 which is connected to the reverse connection rod 76, clockwise, which would then rotate the cam 54 counterclockwise about the control shaft 56 causing the cam follower roller 82 to move along the lower cam V-surface 102 which would also cause the cam follower 84 to rotate clockwise.

Thus, it can be seen that the forward and reverse pedals 58, 60 operate in tandom, i.e. that displacement of one or the other in a direction is met by equal displacement of the other in the opposite direction. The adjustable eye bolt 96 and resilient means 92 connected to the cam follower 84 provide constant tension on the cam follower 84 such that upon the absence of pressure being applied on either pedal 58, 60 the cam follower 84 is rotated in a counterclockwise direction forcing the roller 82 attached to the cam follower 84 to seek the apex 100 of the cam V 88 thus, returning the control shaft 56 to the neutral position.

Figure 2:
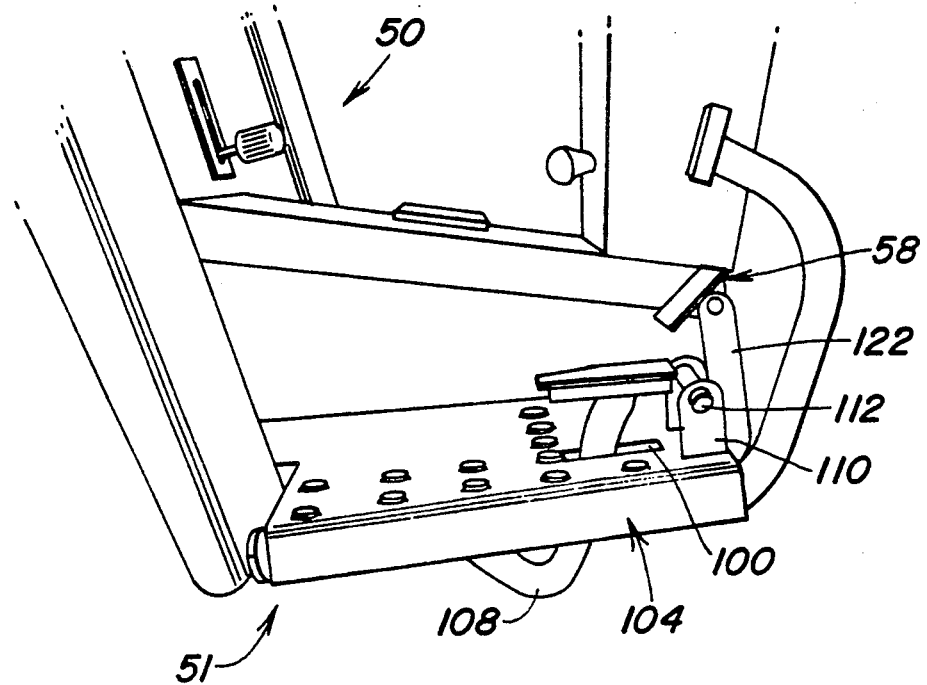
FIG. 2 is a partial side view of the improved pedal system installed on the compact utility tractor of FIG. 1 according to the present invention.
Figure 3:
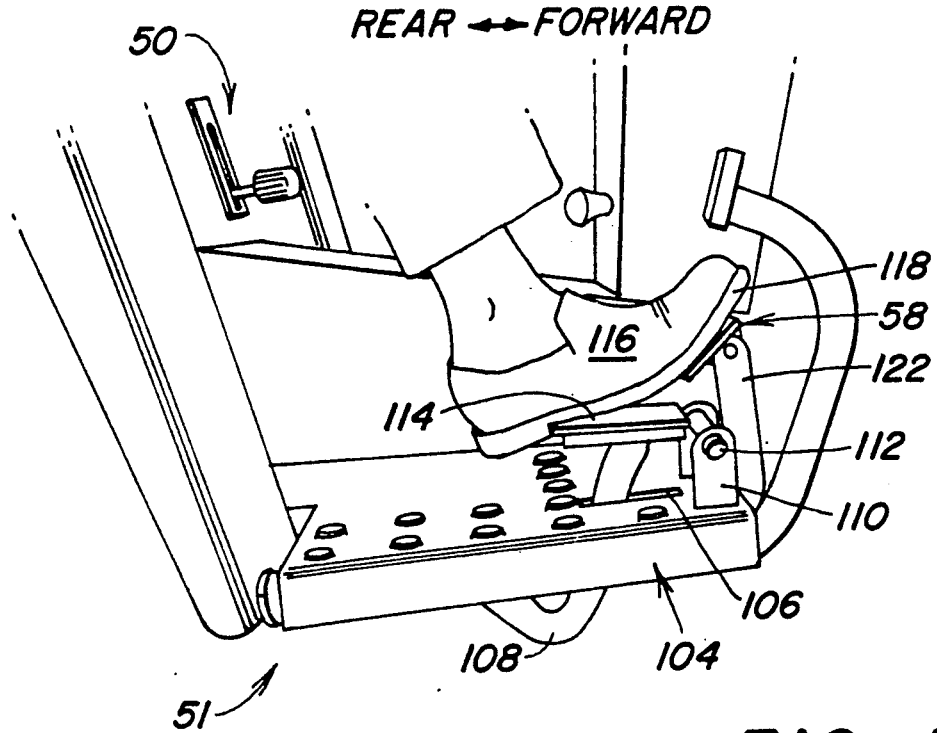
FIG. 3 is a view similar to FIG. 2 illustrating the relative position of the operator's foot and toe when engaging the forward pedal of the pedal system of the present invention.

As can be seen from a close examination of FIGS. 1-3, the basic construction of the ground speed control system 50 has not changed except for the reverse pedal 114. Since, in FIG. 1, the pedals 58 and 60 appear quite similar and when engaged, travel in the same forward arc, it should be readily apparent that an operator could be required to look at which pedal is being engaged to insure that the vehicle would move in the desired direction. Additionally, as shown in FIG. 1, it can be seen that when moving from one pedal to the other, some operators were sometimes required to lift their foot off the foot rest. In fact, the arrangement of FIG. 1, usually required that some operators have their entire foot out of engagement with the foot rest when engaging either the forward or reverse pedal.

As shown in FIGS. 2 and 3, the reverse pedal of FIG. 1 has been relocated so that the portion thereby which is engaged by the operator has been moved from in front of the foot rest to a position coming through the foot rest 104 at a location closer to the rear of the vehicle. The connecting member 108 between the pedal 114 and the shaft 62 has been rerouted through the opening 106 in the foot rest 104 and a bracket 110 for receiving a pivoting shaft 112 has been operatively connected to the top surface of the foot rest 104 perpendicular to the shaft 62 (see FIG. 1). A new reverse pedal 114 has been pivotally connected to the shaft 62 so that it pivots counterclockwise about the shaft 112, down and away from the operator's foot.

As shown in FIG. 3, an operator engages the forward pedal 58 with the toe 48 of his foot 116 while maintaining his heel 120 in contact with the foot rest 104. As with the forward pedal 58, of FIG. 1, the member 122 connected to the shaft 62 has moved an equal distance in the opposite direction of the pedal 114. If the operator were to want to come to a stop and then back the vehicle up, he would release the pressure on the pedal 58 with his toe at which time the transmission would return to neutral. He would then pivot his toe toward the new reverse pedal 114 preferably maintaining his heel in contact with the foot rest. Once the vehicle came to a stop, the operator would press down with his toe onto the new reverse pedal 114, thereby moving the vehicle rearwardly.

The new reverse pedal 114 is constructed so that if the operator inadvertently presses forward on the reverse pedal 114 with his foot in the same position he uses to depress the forward pedal 58; (i.e. he believes he is engaging the forward pedal) no vehicle movement would result because the operator must rotate his foot about his heel to the rear of the vehicle and then press down on the reverse pedal 114. This requires the operator to move his foot through a rearward arc. Specifically, as seen in FIG. 3, to move the vehicle in the forward direction, the operator pushes forward with his toe and the pedal 58 moves in a forward arc. On the other hand, if the operator were to engage the rear pedal 114 and attempt to press forward, his toe would contact the pivotable shaft 112 and the bracket 110 and would not move member 108 and, thus, would not rotate the shaft 62.

Another important feature of the relative construction of the two foot pedals of the present invention is the relative movement of the operator's toe when engaging the pedals. When the operator wants the vehicle to go forward, he moves his toe forward. Specifically, he engages the pedal with his toe and moves his toe forward. When the operator wants the vehicle to go in reverse, he moves his toe rearward and engages the pedal and presses down. Thus, with the relative location of the two pedals of the present invention, it is more difficult for the operator to be confused when engaging either the forward or the reverse pedal because to go in the forward direction, he must move his toe forward and then press forward and when he wants to go in the reverse direction he must move his toe rearward and then press down. These are two different and distinct motions which result in two different and distinct "feels".

DETAILED DESCRIPTION OF A SECOND EMBODIMENT

Referring now to the drawings and specifically to FIGS. 5-8, there is illustrated a second embodiment incorporating the improved ground speed and direction control system of the present invention, generally indicated as 200, installed on a representative lawn and garden tractor 202.

Figure 4:
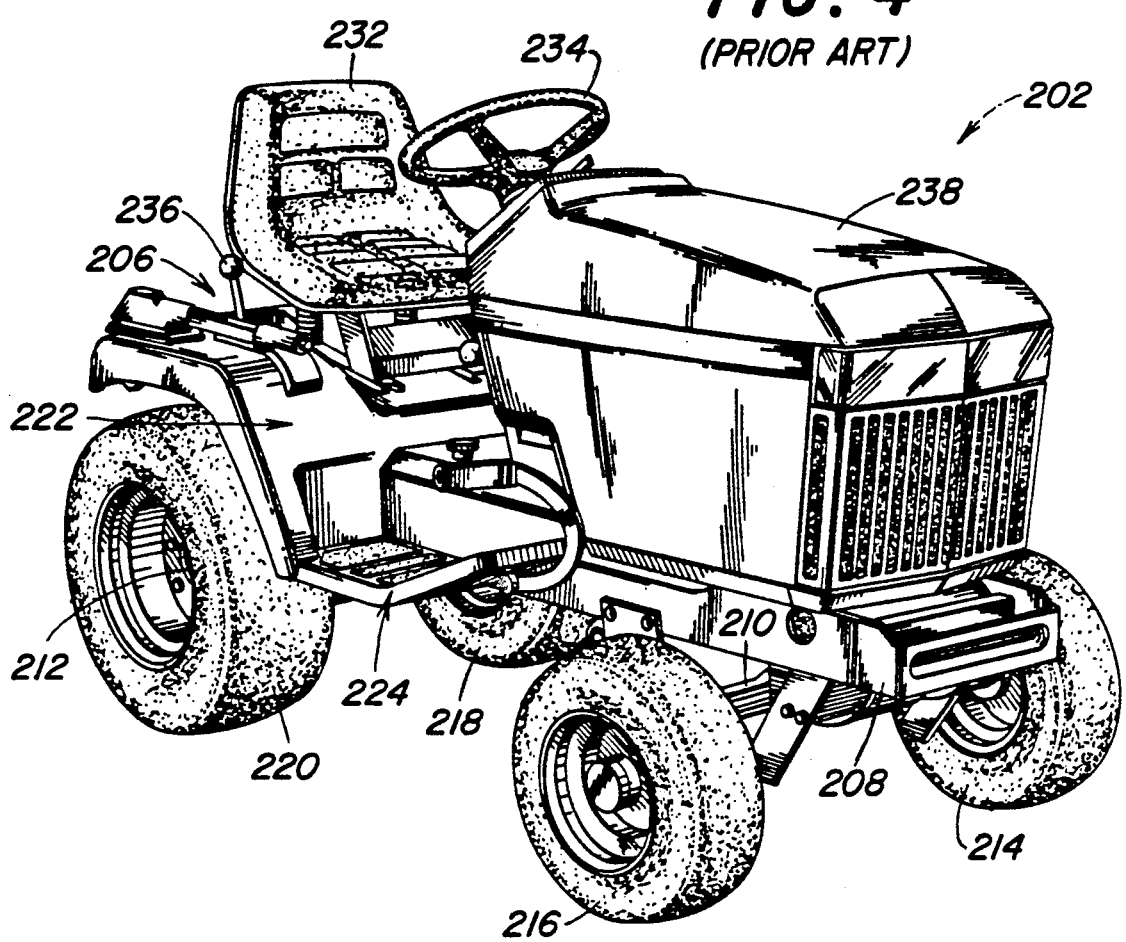
FIG. 4 is a perspective view of a representative conventional lawn and garden tractor.

FIG. 4 illustrates a representative lawn and garden tractor 202 incorporating a hand operated lever ground speed control system 206 installed thereon. As shown in FIG. 4 the representative lawn and garden tractor 202 consists of a frame 208, a front axle 210 and a rear axle 212. Two front wheels 214, 216 are mounted on the axle 210 and two rear wheels 218, 220 are mounted on the rear axle 212. A fender deck 222 is mounted on the frame over the rear axle and includes a pair of foot rests (only one shown) 224. An operator's station 230 which includes a seat 232, a steering wheel 234 and a hand operated direction control lever 236 is operative positioned on the vehicle 202. The direction control lever 236 is operatively connected to the variable speed transmission (not shown). The typical lawn and garden tractor 202 also includes an engine (not shown) and a radiator (not shown) if the engine is liquid cooled both enclosed within a hood 238.

As shown in FIGS. 5-8, the improved ground speed and direction control system 200 for the representative lawn and garden tractor 202 is illustrated. The ground speed and direction control system 200 includes a system 240 for establishing a neutral position and for returning the transmission to the neutral position and a forward and reverse direction control foot pedal system 242. An illustrative embodiment of the neutral location and return system 240 comprises a cam 244 having a V-portion 246 connected to a transmission control shaft 248 and a cam follower 250 pivotally connected to the vehicle.

The cam 244 connection to the transmission control shaft 248 serves as the cam 244 pivot. The cam 244 has a connecting portion 252 which is connected to a secondary pivot member 254 which is operatively connected to the vehicle frame 208.

The cam follower 250 has a roller means or roller 256 rotatably connected thereto for interacting with the V-portion 246 of the cam 244. The cam follower 250 is preferably pivotally connected to the transmission at one end and to resilient means or a spring 258 at the other.

During operation, the cam 244 is operatively connected to the control shaft 248 and pivots about that connection point. The roller 256 is attached to the cam follower 250 and engages the cam V 246. The roller 256 moves along either leg 260, 262 of the V-246 depending upon which way the cam 244 is rotated. The cam's rotation causes the roller 256 to move from the V-apex 264 which in turn causes the cam follower 250 to rotate about an eccentric 266. This rotation stretches the resilient means or spring 258. Upon release of the force causing rotation of the cam, the spring 258 will bias the cam follower 250 towards the cam 244 moving the roller 256 into the apex 264 of the cam V 246.

The forward and reverse pedal system 242 comprises a forward pedal 270 which is connected to a first shaft 274 and a reverse pedal 272 which is operatively connected to a second shaft 276. The two shafts 274, 276 are located approximately parallel to one another with the second shaft 276 being located more remote from the neutral location and position system 240 than the first shaft 274.

The first pedal 270 is operatively connected to one side 277 of a connection means or U-shaped bracket 278 which pivots about the first shaft 274. The other side 279 of the U-shaped bracket 278 is operatively connected to one end 280 of a strap 282 which also pivots about the first shaft 274. The other end 284 of the strap 282 is operatively connected to the secondary pivot member 254 by an elongated member 282.

The secondary pivot member 254 preferably takes the form of an elongated member which is pivotably connected to the vehicle's frame 208 in the middle thereof and is connected to the elongated linkage means 282 at its one end 290 and to the cam 244 having the V-shaped profile 246 at its other end 292.

The reverse pedal 272 is operatively positioned on the foot rest 224 and is operatively connected to one end 294 of the second shaft 276. At the other end 296 of the second shaft 276, a first link 298 is securely connected to the shaft 276. The first link 298 is connected to the second shaft 276 so that it moves with the shaft when the shaft 276 is rotated by engaging the reverse control pedal 272. A second link 300 is pivotably connected to the first link 298 and to the strap 284 by fastener 302.

In order to drive the vehicle in either the forward or reverse directions, an operator would engage either the forward 270 or reverse 272 control pedals. If the operator were to engage the forward pedal 270, which rotates about the first shaft 274, the U-bracket 278 would rotate clockwise thereabout. This rotation would in turn rotate the strap 284 clockwise moving the connection linkage 282 forward toward the forward control pedal 270. Once the control linkage 282 moves forward, the secondary pivot member 254 would pivot clockwise causing the cam 244 to rotate clockwise about the control shaft 248 thereby moving the roller 256 out of the apex 264 of the V-profile 246.

As the forward pedal 270 is engaged, the reverse pedal 272 is normally rotated an equal distance in the opposite direction. If the operator were to remove his foot from the forward pedal, the neutral return spring 258 would pull the cam follower 250 clockwise causing the roller 256 to seek the apex 264 of the cam V 246, thus, returning the control shaft 248 to the neutral position and the pedals to the rest position.

In order to drive the vehicle in the reverse direction, the operator would rotate his foot keeping his heel maintaining contact with the foot rest 224 to the right and rearwardly to engage the reverse foot pedal 272. Downward pressure on the reverse foot pedal would rotate the second shaft 276 counterclockwise which in turn would rotate the first link 298 counterclockwise thereby moving the second link 300 rearward causing the strap 284 to rotate counterclockwise about the first shaft 274. This strap rotation pushes the connection linkage 282 towards the transmission rotating the secondary pivot member 254 causing it to rotate counterclockwise thereby rotating the cam 244 clockwise about the control shaft 248.

As shown in FIGS. 8a and 8b, the second link 300 of the reverse pedal system has a lost motion slot 304 formed therein. The first link 298 is connected to the second link 300 by a pin 306 which fits in the lost motion slot 304. The lost motion slot 304 is utilized in the event that the reverse pedal 272 is actuated in the wrong direction (clockwise) and will then prevent the reverse pedal 272 from actuating the forward pedal 270 thereby moving the vehicle in the wrong direction. As shown in FIG. 8b, a spring 308 is connected between the second shaft 276 and the second link 300 to bias the link 300 to the normal at rest position.

Figure 5:
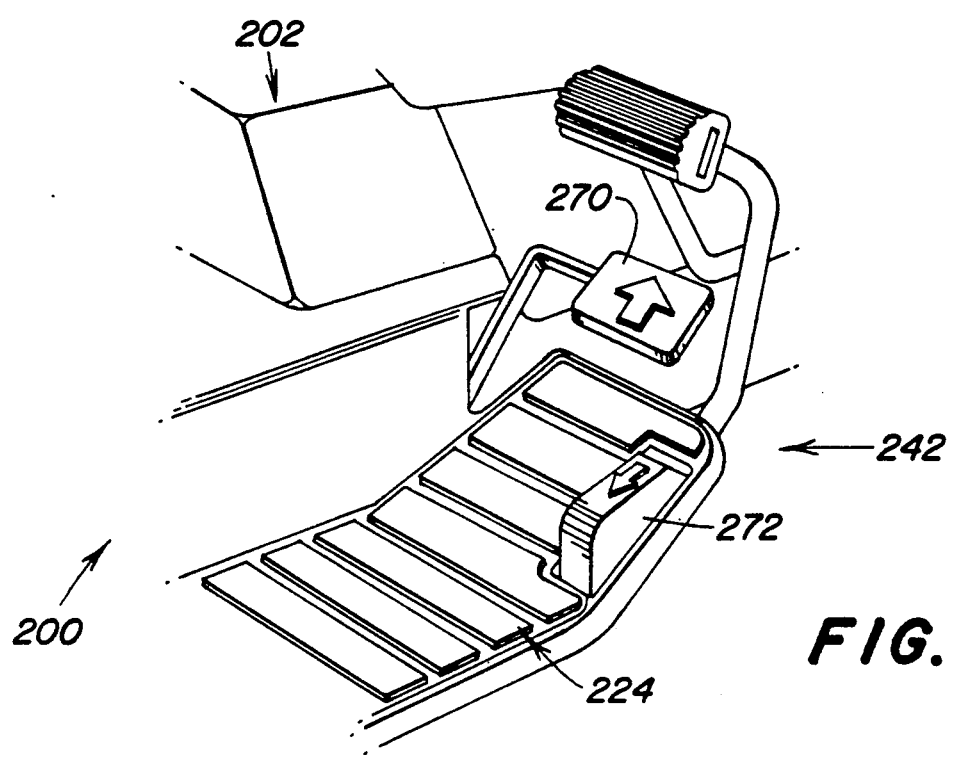
FIG. 5 is a partial perspective view of the improved two-pedal system of the present invention installed on a lawn and garden tractor similar to that of FIG. 4.

As can be clearly seen with reference to FIG. 5, if an operator were to have his heel contacting the foot rest 224 and his toe on the forward control pedal 270, in order to move the vehicle in a forward direction, he would move his toe forward. If the operator were to want to change directions and move the vehicle in reverse, he would with his heel still contacting the foot rest 224, move his toe rearward, thereby allowing the forward control pedal to move towards him and after the vehicle came to a stop or while it was deaccelerating and after disengaging the forward pedal, he would rotate his toe, with his heel preferably still engaging the foot rest, outwardly and rearwardly and then move his toe down to engage the reverse control pedal 272. With the illustrated construction of the improved two pedal control system 242, an operator is required to move his toe when engaging the desired pedal in the same direction as that in which he desires the vehicle to go thereby significantly reducing operator direction selection errors.

DETAILED DESCRIPTION OF A THIRD EMBODIMENT

An improved ground speed and direction control system 400 for a small front mount mower 402 is illustrated in FIGS. 9-14. The representative front mount mower 402 illustrated includes a frame 404, a front axle 406 having two front driving wheels 408 (only one shown) and a single rear wheel 410. A platform 412 is mounted on the frame 404 and includes a pair of foot rests 414 (only one shown). An operator's station 420 is operatively positioned on the vehicle and includes a seat 422 and a steering wheel 424. The front mount mower 402 is powered by an engine transaxle combination 426 located under the vehicle operator station 420 and enclosed by hood 428.

Figure 11B:
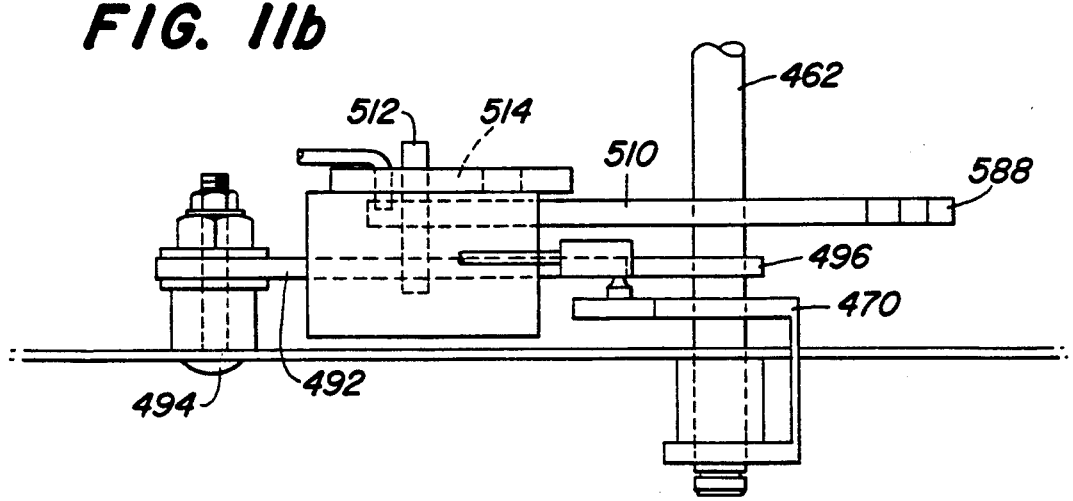
Figure 11A:
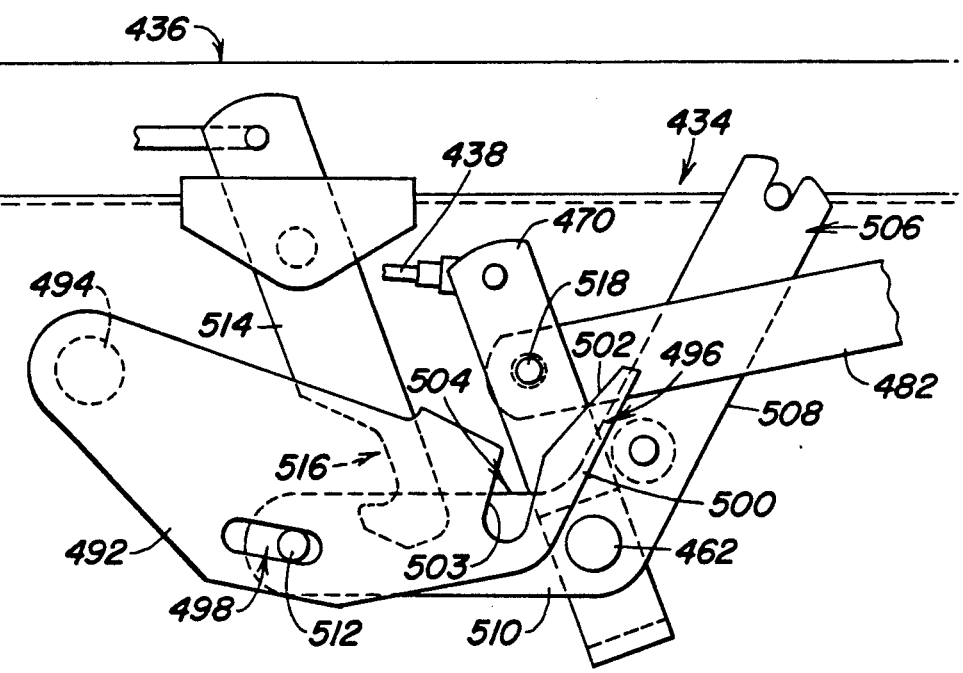
FIG. 11a is a partial right-hand side view of the improved two pedal system brake interconnection system installed in the front-mount mower of FIG. 9.

The ground speed control and direction system 400 includes among other systems the following subsystems: a system 430 for locating an accurate neutral position (FIG. 14) and for returning the transmission to the neutral position; a forward and reverse direction foot pedal system 432 (FIGS. 10 and 13); a brake system 434 interconnected with the foot control system 432 (FIGS. 11a, 11b, 12 and 13); and a park brake system 436 interconnected with the brake system 434 and the pedal control system 432 (FIG. 11a).

Figure 14:
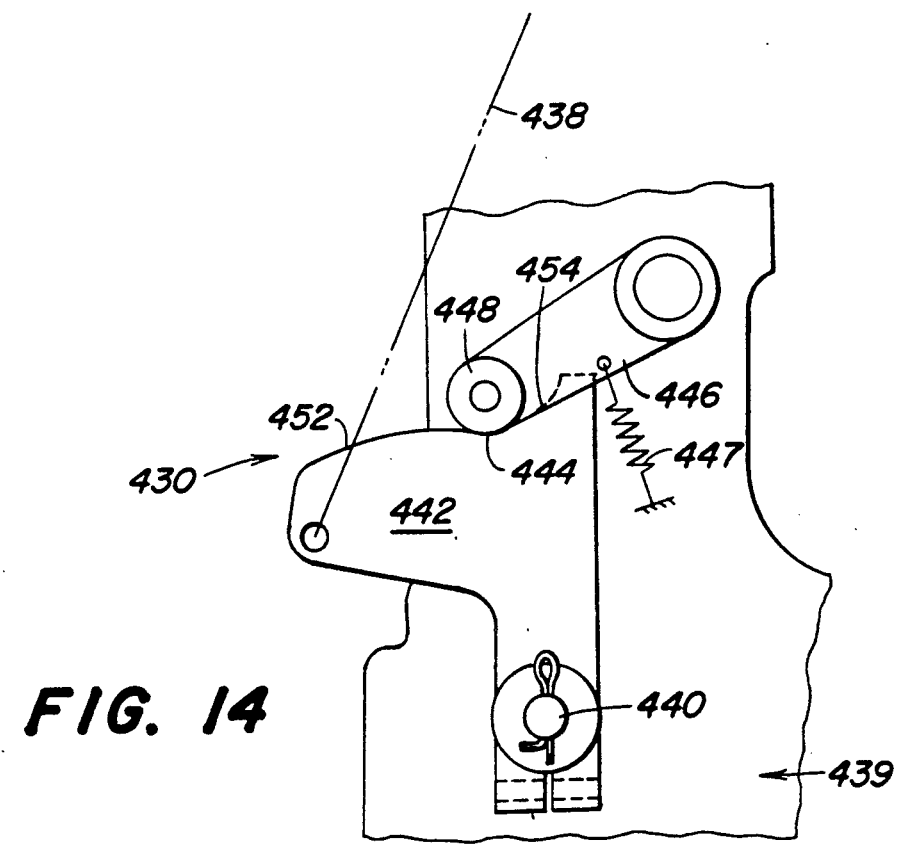
FIG. 14 is a partial rear view illustrating the neutral location and return system installed on the front-mount mower of FIG. 9.

As shown in FIG. 14, the neutral position location and return system 430 comprises connection linkage or cable 438 designed to control a control shaft 440 of a variable speed transaxle 439. The neutral location and return system 430 utilized with the small front mount mower 402 is similar to the two systems disclosed within this application and to those disclosed in U.S. Pat. No. 4,759,417, issued Jul. 26, 1988 to Wanie et al., the disclosure of which is hereby incorporated by reference.

The system 400 basically comprises a cam 442 having a V-shaped notch 444 formed therein. A cam follower 446 having a roller 448 operatively positioned thereon for interaction with the cam 442. The cam follower 446 is biased by a resilient or spring means 447 so that when the forces cause the roller 448 to interact with either of the cam surfaces 452, 454, the resilient means returns the roller 448 to the V-notch 444. The cam 442 is adjusted so that the V-notch 444 corresponds to the transmission neutral position when the roller 448 is positioned therein. The linkage 438, in this particular case a control cable, interconnects the cam 442 to the forward and reverse direction control pedal system 432.

Figure 9:
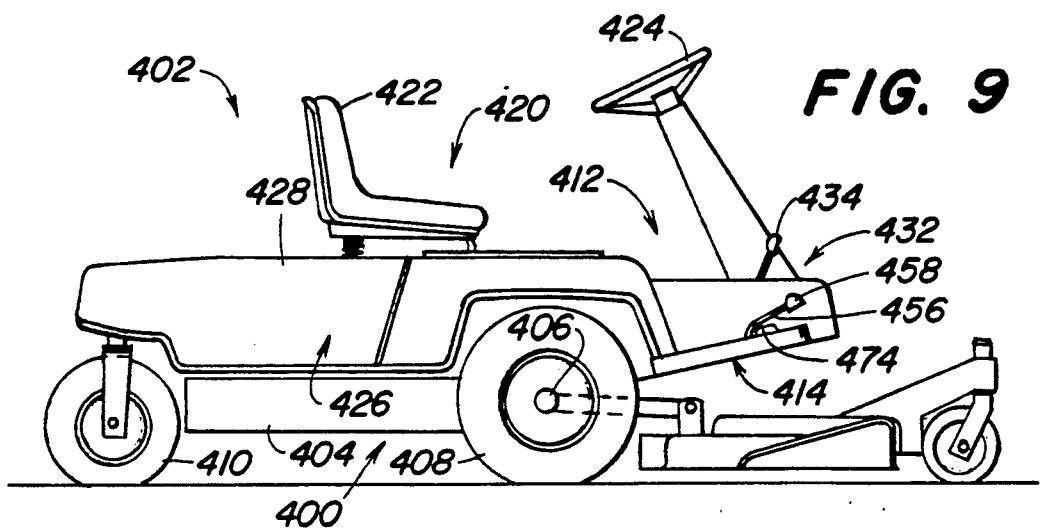
FIG. 9 is a side view of a front-mount mower having the improved two pedal system of the present invention installed therein.

As shown in FIGS. 9-10 and 12, the forward and reverse direction foot pedal system 432 comprises a forward pedal 456 including a pad 458 and an arm 460. The arm 460 is pivotably operatively connected to a first shaft 462. A U-shaped bracket 464 has one portion 466 of the U-member 464 connected to the arm 460 and the other portion 468 U-member 464 extending to a strap, 470. The strap 470 is rotatably connected at one end to the first shaft 462 and at the other end to the cable linkage means 472 which is operatively connected at the other end to the neutral locate and return system 430 and the variable speed transaxle 439 by the cable 438.

A reverse pedal 474 is connected to a second shaft 476, positioned parallel to and more forwardly on the vehicle than the first shaft 462. A first link 478 having a pin 480 operatively connected thereto is securely connected to the other end of the second shaft 476. A second link 482 having a lost motion slot 484 formed in one end and being operatively connected by pin 518 to the strap 470 at the other end interconnects the first link 478 with the strap 470. The second link 482 is connected to the strap 470 at a position intermediate the two ends of strap 470.

In order to drive the front mount mower 402 in either the forward or reverse directions, an operator would engage either the forward or the reverse pedals. If the operator were to engage the forward pedal 456, the arm 460 with the U-shaped member 464 connected thereto would rotate clockwise about the first shaft 462. This would rotate the strap 470 clockwise about the first shaft 462 pulling the cable 438 connected to the other end of the strap 470 forward. At the other end of the cable, the roller 448 (see FIG. 14) would be forced out of the V 444 of the cam 442 and would move along the cam surface 452 as disclosed in the above mentioned patent.

As the forward pedal 456 is engaged and rotated clockwise, the second link 482 connected to the reverse pedal 474 would move forward with relationship to the vehicle, pushing the first link 478 forward causing the pin 480 to move and the second shaft 476 to rotate clockwise raising the reverse pedal 474 out of the foot rest 414.

In order to move the vehicle in the reverse direction, an operator would engage the reverse control pedal 474 thereby rotating the second shaft 476 counterclockwise which in turn would rotate the first link 478 counterclockwise. The pin 480 on the first link 478 would then engage the rearward end of the lost motion slot 484 and move the second link 482 rearward with respect to the vehicle. This action would rotate the strap 470 counterclockwise about the first shaft 462 shifting the cable 438 connected to the end of the strap 470 toward the rear of the vehicle, moving the cam out of engagement with the roller in the direction opposite to that discussed above.

A spring or resilient means (not shown) is connected between the pin 480 and the second link 482 for biasing the reverse pedal to the normal position in case the pedal is actuated in the wrong direction. If the reverse pedal 474 were to be actuated in the wrong direction (clockwise), then the lost motion slot 484 in the second link 482 would prevent the reverse pedal 474 from actuating the forward pedal 456 and moving the vehicle in the forward direction. Specifically, this feature is important should debris or other foreign matter become lodged in the reverse pedal mechanism and this would insure that accidental engagement of the reverse pedal 474 would not cause an equal rotation of the forward pedal 456 and thereby cause vehicle movement and/or increased vehicle speed in the forward direction.

Looking now to FIGS. 12 and 13, the interconnection between the vehicle brake system 434, the park brake system 436 with the two pedal forward and reverse pedal control system 432 and the neutral location and return system 430 is specifically illustrated.

The vehicle brake system 434 includes a foot brake 486 which has a brake pad 488 connected to one end of a brake arm 490. The brake arm 490 is bolted to the U-shaped arm 506 at its lower portion 508, which arm 506 is fitted over the shaft 462. The rearward portion 510 of arm 506 carries the brake pin 512. Looking now to FIGS. 11a and 12, an interlock cam 492 is utilized to force the foot pedal cable linkage means 472 to the neutral position when the brake 486 is engaged. The interlock cam 492 is rotatably connected to the vehicle frame by an adjustable pivot 494 at one end thereof. The cam 492 includes a hook member 496 formed in its other end and a slot 498 formed intermediate the hook member 496 and the adjustable pivot 494. The hook member 496 has an extended portion 500 with a cam surface 502 formed thereon most remote from the adjustable pivot 494. The cam surface 502 is connected to an opening 504 formed in the interlock cam 492.

The park brake pin 512 engages the slot 498 in the interlock cam 492. A park brake latch 514 having a hook member 516 at one end and pivotally connected to the vehicle at the other end is utilized to lock the vehicle in place with the brakes applied. The park brake latch 514 is rotatably moveable via a park brake lever (not shown) located on the vehicle fender.

When the brakes are engaged by an operator contacting the brake pedal 486 with his foot, the brake arm 490 is rotated towards the front of the vehicle, the arm 490 in turn rotates the shaft 462 clockwise, and the park brake pin 512 which is connected to the rearward portion 510 of brake arm 506 forces the interlock cam 492 upward to engage a roller 518 which is positioned at the connection between the strap 470 and the second link member 482. The roller 518 engages the cam surface 503 of the hook member 496 as the interlock cam 492 is rotated counterclockwise into engagement. When the vehicle is moving in the reverse direction, the cam surface 503 engages the roller 518 as mentioned above. Engagement of the brake 486 forces contact between the hook member 496 and the roller 518 thereby returning the variable speed transaxle to the neutral position. The neutral position was originally established with the V-notch in the cam at the transaxle and was coordinated with the interlock cam 492 position by use of the adjustable pivot 494.

The park brake latch 514 locks the brakes in the engaged position. In the engaged position, the hook member 516 of the park brake latch 514 engages the park brake pin 512, thus, firmly positioning the roller 512 inside the interlock cam slot 498 and thus returning the vehicle transmission to the neutral position.

A brake engaged sensing switch (not shown) is interconnected to a convention seat switch (not shown) for indicating operator presence and to the vehicle electrical system (not shown) so that if an operator were to leave the vehicle seat with the parking brake disengaged and the engine running, the engine would shut off. This interconnecting feature allows an operator to dismount the vehicle with the parking brake engaged and still have the engine remain operating. Thus, the interconnection of the interlock cam 492, the park brake latch 514 with the improved ground speed and direction control system 400 provides for safe operation of the vehicle.

As can be seen from the above, the park brake pin 512 serves a dual function. Specifically, the park brake pin 512 is utilized as the brake 490 is actuated so that the interlock cam 492 is engaged with the roller 518, thus returning and locking the forward 456 and reverse 474 control pedals in neutral. Additionally, the park brake pin 512 is used by the park brake latch 514 locking the vehicle brake system in the full engaged position thereby returning the transmission to neutral and to lock the forward and reverse control pedals in neutral. The park brake pin 512 facilitates simultaneously locking the forward and reverse pedals so that even if they were to be accidentally engaged by an operator dismounting or mounting the vehicle, they would not move to cause the transmission to be engaged and causing the engaging vehicle to move. This particular interlock system between the forward and reverse control pedal, the system for locating and returning the transmission to the neutral position, the brake system and the park brake system utilizes a minimum of parts, thereby reducing the potential manufacturing tolerance build up between the parts and significantly reducing the cost and time of assembly.

While the forms of apparatus herein described constitute preferred embodiments of this invention, it is to be understood that the invention is not limited to these precise forms of apparatus, and that changes may be made therein without departing from the scope of the invention, which is defined in the appended claims.

We claim:

1. A mechanism for driving a vehicle having an operator seat and a variable speed transmission having forward, reverse and neutral positions, said mechanism comprising:

a foot rest carried by the vehicle for receiving the foot of an operator, said foot rest having a heel receiving zone;

at least two foot control pedals operatively connected to said transmission and engageable by the foot of an operator, said pedals controlling the direction of movement and the speed of said vehicle, one of said pedals controlling the speed in the forward direction and the second of said pedals controlling the speed in the reverse direction, said forward and reverse pedals being laterally spaced of each other and located forwardly of the heel receiving zone such that the operator can swing the forward portion of his foot laterally and engage the forward or reverse pedal while the heel portion is retained in the heel receiving zone, the direction of movement of the forward portion of the operator's foot as it depresses each of said pedals and the pedal being depressed corresponding to the direction of vehicle movement effected by depressing said pedal; and means, operatively connected to said foot pedals, for returning said transmission to said neutral position when said pedals are disengaged.

2. The mechanism of claim 1 wherein said forward control pedal in relation to the operator seat is located relatively closer to the front end of said vehicle than said reverse control pedal.

3. A mechanism for controlling the ground speed and direction of a vehicle having an operator seat and a variable speed transmission with forward, neutral and reverse positions, said mechanism comprising:

a foot rest carried by the vehicle for receiving the foot of an operator, said foot rest having a heel receiving zone;

two foot operated pedals operatively connected to said transmission, one of said pedals adapted to control the forward speed of said vehicle and the second of said pedals adapted to control the reverse speed of said vehicle, said forward and said reverse control pedals being supported respectively by first and second shaft means and positioned on said vehicle forwardly of the heel receiving zone so that an operator may engage either of said pedals with the forward portion of his foot while the heel portion remains in the heel receiving zone, said pedals each being adapted to swingably move in a direction corresponding to the direction of vehicle movement effected by said pedal; and means, operatively interconnecting said foot pedals and said transmission, for returning said transmission to said neutral position upon disengagement of said foot pedals.

4. The mechanism of claim 3 wherein said interconnecting means further comprises:

means for operatively connecting said transmission to one of said two shaft means;

means for interconnecting the connecting means and said forward speed control pedal; and means operatively connected to said other of said two shaft means for interconnecting said reverse control pedal with said connecting means and said transmission.

5. A mechanism for controlling the ground speed and direction of a vehicle having an operator seat, an engine, a pair of ground engaging wheels, a variable speed transmission operatively connected to the wheels, a control shaft selectively movable between forward, neutral and reverse positions, and a brake system operatively connected to said wheels, said mechanism comprising:

means, operatively connected to said control shaft, for location the neutral position of said transmission;

first and second non-aligned shaft means;

the second shaft means being spaced from the first shaft means and operatively connected thereto;

a foot rest carried by the vehicle for receiving the foot of an operator and having a heel receiving zone;

a forward foot control pedal operatively connected to the first shaft means and adapted to control the forward speed of the transmission as it swingably moves in a forwardly directed path;

a reverse foot control pedal operatively connected to the second shaft means and adapted to control the reverse speed of the transmission as it swingably moves in a rearwardly directed path;

said forward and reverse foot control pedals being position forwardly of the heel receiving zone to enable the operator to retain the heel portion of their foot in the heel receiving zone and utilize the forward portion of their foot to control the forward or reverse pedal; and means operatively connecting said foot control pedals and said locating means, for returning said transmission to said neutral position upon disengagement of said foot control pedals.

6. The mechanism of claim 5 wherein said returning means further comprises:

first connection means operatively connected to said locating means;

second connection means operatively connected to said first connection means and said forward foot control pedal; and third connection means operatively connected to said second connection means and said second shaft means.

7. The mechanism of claim 1 wherein said first connection means further comprises:

a single rod means and the second connection means includes;

a strap operatively connecting said rod means with the forward foot control pedal.

8. The mechanism of claim 6 wherein said second connection means further comprises a U-shaped member.

9. The mechanism of claim 6 wherein said third connection means further comprises:

one link operatively connected to said first connection means; and another link operatively connected to the one link and to said second shaft means.

10. The mechanism of claim 5 wherein said locating means further comprises:

cam means operatively connected to said transmission and having a V-profile formed therein;

cam follower means operatively connected to said vehicle;

roller means, operatively connected to said cam follower means, for interacting with said V-profile of said cam means; and resilient means, operatively connected to said cam follower means, for biasing said roller means toward said V-profile of said cam means.

11. The mechanism of claim 9 further comprising:

lost motion means, operatively positioned in said second link, for preventing the actuation of said forward pedal should the reverse pedal be forced to rotate forwardly about said second shaft.

12. The mechanism of claim 5 further comprising:

means for interconnecting said brake system, said neutral locating means and said foot control pedals.

13. The mechanism of claim 12 wherein said interconnecting means further comprises:

an interlock cam having a cam surface and a slot formed therein operatively connected to said vehicle;

a brake arm having a pin formed thereon for interacting with said slot; and a park brake latch having a hook member operatively connected to said vehicle and to a park brake mechanism, for locking said brake system and preventing said foot control pedals from actuating said transmission when said park brake latch engages said pin.

14. The mechanism of claim 13 wherein said cam surface of said interlock cam engages a roller operatively positioned between a link and a strap carried by the first shaft means, thereby returning said transmission to the neutral position.

15. A mechanism for controlling the ground speed and direction of a vehicle having an operator seat, an engine, a pair of ground engaging wheels, a variable speed transmission operatively connected to the wheels, a control shaft selectively movable between forward, neutral and reverse positions, and a brake system operatively connected to the wheels, said mechanism comprising:

means operatively connected to said control shaft for locating the neutral position of said transmission;
a forward foot control pedal;
a reverse foot control pedal;
first shaft means operatively connected to said forward foot control pedal;
second shaft means operatively connected to said reverse foot control pedals; and
means operatively connecting said foot control pedals and said locating means for returning said transmission to said neutral position upon disengagement of said foot control pedals, said returning means including
first connection means operatively connected to said locating means,
second connection means operatively connected to said first connection means and said forward foot control pedal, including a first link means operatively connected to said first connection means, and
third connection means operatively connected to said second connection means and said second shaft means,
said third connection means including a second link means operatively connected to the first link means and to said second shaft means.

16. The mechanism of claim 15 further comprising lost motion means operatively positioned in said second link means for preventing the actuation of said forward pedal should the reverse pedal be forced to rotate forwardly about said second shaft means.

17. A mechanism for controlling the ground speed and direction of a vehicle having an operator seat, an engine, a pair of ground engaging wheels, a variable speed transmission operatively connected to the wheels, a control shaft selectively movable between forward, neutral and reverse positions, and a brake system operatively connected to the wheels, said mechanism comprising:

means, operatively connected to said control shaft, for locating the neutral position of said transmission;
a forward foot control pedal;
a reverse foot control pedal;
first shaft means operatively connected to said forward foot control pedal;
second shaft means operatively connected to said reverse foot control pedals;
means, operatively connecting said foot control pedals and said locating means, for returning said transmission to said neutral position upon disengagement of said foot control pedals;
means for interconnecting said brake system, said neutral location system and said foot control pedals including an interlock cam having a cam surface and a slot formed therein operatively connected to said vehicle;
a brake arm having a pin formed thereon for interacting with said slot; and
a park brake latch having a hook member operatively connected to said vehicle and to a park brake mechanism, for locking said brake system and preventing said foot control pedals from actuating said transmission when said park brake latch engages said pin.

18. The mechanism of claim 17 wherein the cam surface of the interlock cam engages a roller operatively positioned between said second link and said strap thereby returning said transmission to the neutral position.

19. A mechanism for controlling the ground speed and direction of a vehicle having a frame which supports a variable speed transmission with forward, neutral and reverse positions and an operator's station including a seat and a foot rest for receiving at least one foot of the operator when positioned in the seat, said mechanism comprising:

shaft means supported by the frame;
a heel receiving zone carried by the foot rest;
a first foot operated pedal supported by the shaft means, operatively connected to the transmission and adapted to control the forward speed of said vehicle as the pedal is moved in a forwardly directed path relative to said vehicle;
a second foot operated pedal supported by the shaft means, operatively connected to the transmission and adapted to control the rearwardly speed of said vehicle as said pedal is moved in a rearwardly directed path relative to said vehicle;
said first and second pedals being laterally spaced of each other and located forwardly of the heel receiving zone so that the operator may engage said pedals with the forward portion of his foot while the heel portion is retained in the heel receiving zone; and
means, operatively interconnecting the foot pedals and the transmission for returning said transmission to a neutral position upon disengagement of the foot pedals.

20. The invention defined in claim 19 wherein the forward portion of the foot is moved in an arcuate path between the two pedals.

21. The invention defined in claim 19 wherein the second pedal is partially moveable through the foot rest as it is activated.

22. The invention defined in claim 19 wherein the first and second pedals are fore-and-aft overlapping, but laterally spaced apart.

23. The invention defined in claim 19 wherein forwardly movement of the first pedal prevents simultaneous rearwardly movement of the second pedal.

24. The invention defined in claim 29 wherein the first shaft means is carried beneath the heel receiving zone.

25. The invention defined in claim 19 wherein each pedal is carried by an arm which in turn is coupled to the shaft means.

26. The invention defined in claim 19 wherein the shaft means includes first and second interconnected shafts with the first and second pedals being supported respectively on one of said shafts.

27. The invention defined in claim 26 wherein the two shafts are parallel.

28. The invention defined in claim 26 wherein the two shafts are non-aligned.

29. The invention defined in claim 26 wherein both shafts are carried beneath the foot rest.

30. The invention defined in claim 26 wherein the second shaft is located forwardly of the first shaft.

31. A mechanism for controlling the ground speed and direction of a vehicle having a frame which supports a variable speed transmission with forward, neutral and reverse positions and an operator's station including a seat and a foot rest for receiving at least one foot of the operator when position in the seat, said mechanism comprising:

first and second shaft means supported by the frame;
a heel receiving zone carried by the foot rest;
a first foot operated pedal supported by the first shaft means, operatively connected to the transmission and adapted to control the forward speed of said vehicle as the pedal is moved in a forwardly directed path relative to said vehicle;
a second foot operated pedal supported by the second shaft means, operatively connected to the transmission and adapted to control the rearwardly speed of said vehicle as said pedal is moved in a rearwardly directed path relative to said vehicle;
said first and second pedals being positioned on the vehicle proximate to the foot rest and relative to each other so that an operator's foot may engage either of said pedals with the forward portion of his foot while the heel portion is retained in the heel receiving zone, and
means, operatively interconnecting the foot pedals and the transmission for returning said transmission to a neutral position upon disengagement of the foot pedals.

32. The invention defined in claim 31 wherein the second pedal is spaced laterally outwardly of and rearwardly from the first pedal.

33. The invention defined in claim 31 wherein the first shaft means includes a first shaft, and the second shaft means includes a second shaft, the second shaft being positioned forwardly of the first shaft.

34. The invention defined in claim 31 wherein an opening is provided in the foot rest, and the second pedal is movable in part through said opening.

35. The invention defined in claim 31 wherein the two shaft means are carried by the frame directly below the foot rest.

36. The invention defined in claim 31 wherein the first and second shaft means are interconnected such that as one of the pedals is depressed, the other pedal raises relative to the foot rest.

37. A mechanism for controlling the ground speed and direction of a vehicle having a frame which supports a variable speed transmission with forward, neutral and reverse positions and an operator's station including a seat and a foot rest for receiving at least one foot of the operator when positioned in the seat, said mechanism comprising:

first and second non-aligned shaft means supported by the frame;
a heel receiving zone carried by the foot rest;
a first foot operated pedal supported by the first shaft means, operatively connected to the transmission and adapted to control the forward speed of said vehicle as the pedal is moved in a forwardly directed path relative to said vehicle;
a second foot operated pedal supported by the second shaft means, operatively connected to the transmission and adapted to control the rearwardly speed of said vehicle as said pedal is moved in a rearwardly directed path relative to said vehicle;
said first and second pedals being positioned on the vehicle proximate to the foot rest and relative to each other so that an operator's foot may engage either of said pedals with the forward portion of his foot while the heel portion is retained in the heel receiving zone, and
means, operatively interconnecting the foot pedals and the transmission for returning said transmission to a neutral position upon disengagement of the foot pedals.

38. The invention defined in claim 37 wherein the second shaft means are positioned forwardly of the first shaft means.

39. The invention defined in claim 37 wherein there is provided an opening in the foot rest through which the second pedal projects.

40. The invention defined in claim 37 wherein the two shaft means are carried by the frame directly below the foot rest.

41. The invention defined in claim 39 wherein the second pedal is spaced laterally outwardly of and rearwardly of the first pedal.

42. The invention defined in claim 37 wherein the first and second shaft means are interconnected.

43. The invention defined in claim 37 wherein the first shaft means includes a first shaft, the second shaft means includes a second shaft, the shafts being interconnected such that rotation of the first shaft in a forwardly direction causes rotation of the second shaft in a forwardly direction.

44. A mechanism for controlling the ground speed and direction of a vehicle having a frame which supports a variable speed transmission with forward, neutral and reverse positions and an operator's station including a seat and a foot rest for receiving at least one foot of the operator when positioned in the seat, said mechanism comprising:

first and second non-aligned and fore-and-aft offset shafts supported by the frame;
a heel receiving zone carried by the foot rest above the first shaft;
a first foot operated pedal supported by the first shaft, operatively connected to the transmission and adapted to control the forward speed of said vehicle as the pedal is moved in a forwardly directed path relative to said vehicle;
a second foot operated pedal supported by the second shaft, said pedal being spaced laterally outwardly of and rearwardly of the first pedal and being operatively connected to the transmission and adapted to control the rearwardly speed of said vehicle as said pedal is moved in a rearwardly directed path relative to said vehicle;
said first and second pedals being positioned on the vehicle proximate to the foot rest and relative to each other so that an operator's foot may engage either of said pedals while the heel portion is retained in the heel receiving zone; and
means operatively interconnecting the foot pedals and the transmission for returning said transmission to a neutral position upon disengagement of either of the foot pedals.

45. A mechanism for controlling the ground speed and direction of a vehicle having a frame which supports a variable speed transmission with forward, neutral and reverse positions and an operator's station including a seat and a foot rest for receiving at least one foot of the operator when positioned in the seat, said mechanism comprising:

first and second fore-and-aft spaced shafts supported by the frame;

a heel receiving zone carried by the foot rest above the first shaft;

a first foot operated pedal supported by the first shaft, operatively connected to the transmission and adapted to control the forward speed of said vehicle as the pedal is moved in a forwardly directed path relative to said vehicle;

a second foot operated pedal supported by the second shaft, said pedal being spaced laterally of and rearwardly of the first pedal and being operatively connected to the transmission and adapted to control the rearwardly speed of said vehicle as said pedal is moved in a rearwardly directed path relative to said vehicle;

said first and second pedals being positioned on the vehicle proximate to the foot rest and relative to each other so that an operator's foot may engage either of said pedals while the heel portion is retained in the heel receiving zone; and means operatively interconnecting the foot pedals and the transmission for returning said transmission to a neutral position upon disengagement of the foot pedals.

* * * * *

UNITED STATES PATENT AND TRADEMARK OFFICE
CERTIFICATE OF CORRECTION

PATENT NO. : 5,048,638
DATED : 17 September 1991
INVENTOR(S) : Jerry R. Duncan et al It is certified that error appears in the above-identified patent and that said Letters Patent is hereby corrected as shown below:

Column 13, line 47, delete "location" and insert --locating--;
           line 64, delete "position" and insert --positioned--.

Column 14, line 15, delete "1" and insert --6--.

Column 16, line 53, delete "29" and insert --19--.

Column 17, line 8, delete "position" and insert --positioned--.

Column 18, line 20, delete "39" and insert --37--.

Signed and Sealed this

Fifth Day of January, 1993

Attest:

DOUGLAS B. COMER

*Attesting Officer*     Acting Commissioner of Patents and Trademarks